United States Patent
Xie et al.

(10) Patent No.: US 11,350,501 B2
(45) Date of Patent: May 31, 2022

(54) LED DRIVING CIRCUIT BASED ON T-SHAPED LAMP TUBE

(71) Applicant: FOSHAN ELECTRICAL AND LIGHTING CO., LTD, Guangdong (CN)

(72) Inventors: Jiang Xie, Guangdong (CN); Di Huang, Guangdong (CN); Yiguang Zhu, Guangdong (CN); Jianhui Chen, Guangdong (CN)

(73) Assignee: FOSHAN ELECTRICAL AND LIGHTING CO., LTD, Foshan (CN)

( * ) Notice: Subject to any disclaimer, the term of this patent is extended or adjusted under 35 U.S.C. 154(b) by 0 days.

(21) Appl. No.: 17/266,104

(22) PCT Filed: Nov. 16, 2019

(86) PCT No.: PCT/CN2019/119035
§ 371 (c)(1),
(2) Date: Feb. 5, 2021

(87) PCT Pub. No.: WO2021/088114
PCT Pub. Date: May 14, 2021

(65) Prior Publication Data
US 2022/0117058 A1 Apr. 14, 2022

(30) Foreign Application Priority Data
Nov. 4, 2019 (CN) .......................... 201911063677.9

(51) Int. Cl.
*H05B 45/50* (2022.01)
*H05B 45/375* (2020.01)
*H05B 45/325* (2020.01)

(52) U.S. Cl.
CPC ......... *H05B 45/375* (2020.01); *H05B 45/325* (2020.01); *H05B 45/50* (2020.01)

(58) Field of Classification Search
CPC ........ H05B 45/10; H05B 45/30; H05B 45/32; H05B 45/325; H05B 45/275; H05B 45/50; H05B 47/00
See application file for complete search history.

(56) References Cited

U.S. PATENT DOCUMENTS

2013/0147350 A1* 6/2013 Yang ..................... H05B 45/50
315/52

FOREIGN PATENT DOCUMENTS

CN 107148113 A 9/2017

* cited by examiner

*Primary Examiner* — Jimmy T Vu

(57) ABSTRACT

A LED driving circuit based on a T-shaped lamp tube including: an input rectifying circuit, a Buck circuit, an IC power supply circuit, a PWM control integrated circuit, a compatible electronic ballast circuit, and an output rectifying and filtering circuit. The present application can realize the compatibility of single-ended input of AC mains, double-ended input of AC mains and double-ended input of an electronic ballast, and is simple in circuit, small in size, high in efficiency and stable in performance.

10 Claims, 6 Drawing Sheets

LED DRIVING CIRCUIT BASED ON T-SHAPED LAMP TUBE

TECHNICAL FIELD

The present invention relates to the technical field of circuits, in particular to LED driving circuit based on T-shaped lamp tube.

BACKGROUND

In recent decades, T-type fluorescent lamps have been vigorously promoted. Due to the fact that the fluorescent lamp has the advantages of energy saving, the fluorescent lamp has the disadvantages of being short in service life and large in harm to the environment. Therefore, many manufacturers are gradually stopping the production of fluorescent lamps.

Along with the progress of science and technology, more and more countries are popularized in LED lighting products, and the LED lighting is more environment-friendly, energy-saving, efficient and more advantageous in product performance. The T-shaped lamp tube (mainly T5 and T8) is also not an exception.

However, in European countries, the cost of the transformation line is extremely high. In order to realize that the LED lighting product is more convenient and simple to install, a LED T-shaped product which can realize single-ended or double-ended AC mains input and can be compatible with an electronic ballast is needed to replace the conventional fluorescent lamp.

SUMMARY

The technical problem to be solved by the present invention is to provide a LED driving circuit based on a T-shaped lamp tube. The LED driving circuit based on a T-shaped lamp tube can realize the compatibility of single-ended input of AC mains, double-ended input of AC mains and double-ended input of an electronic ballast, and is simple in circuit, low in system cost, small in size, high in efficiency and stable in performance.

The technical problem to be solved by the present invention is further to provide an intelligent cutting system for lace materials, which can realize full-automatic feeding and cutting for lace materials, and is high in automation degree.

In order to solve the above technical problem, the present invention provides a LED driving circuit based on a T-shaped lamp tube, including: an input rectifying circuit, a Buck circuit, an IC power supply circuit, a PWM control integrated circuit, a compatible electronic ballast circuit, and an output rectifying and filtering circuit, wherein the input rectifying circuit, the Buck circuit, the IC power supply circuit, the PWM control integrated circuit, the compatible electronic ballast circuit, and the output rectifying and filtering circuit are electrically connected with each other; output ends of the input rectifying circuit are respectively connected with an input end of the Buck circuit and an input end of the IC power supply circuit, an output end of the Buck circuit is connected with an input end of the output rectifying and filtering circuit, an output end of the IC power supply circuit is connected with an input end of the PWM control integrated circuit, output ends of the PWM control integrated circuit are respectively connected with the input end of the Buck circuit and the input end of the output rectifying and filtering circuit; an output end of the compatible electronic ballast circuit is connected with the input end of the output rectifying and filtering circuit; an input end of the input rectifying circuit and an input end of the compatible electronic ballast circuit are connected with a power supply; when the input end of the input rectifying circuit and the input end of the compatible electronic ballast circuit are directly connected with the power supply, the input end of the compatible electronic ballast circuit does not work, and when the input end of the input rectifying circuit and the input end of the compatible electronic ballast circuit are connected with the power supply through the electronic ballast, the input end of the compatible electronic ballast circuit works.

As an improvement to the above scheme, the compatible electronic ballast circuit includes a detection capacitor and a ballast sub-circuit, one end of the detection capacitor is connected with the power supply, the other end of the detection capacitor is connected with an input end of the ballast sub-circuit, and an output end of the ballast sub-circuit is connected with the input end of the output rectifying and filtering circuit; when one end of the detection capacitor is directly connected with the power supply, the detection capacitor is broken, and the ballast sub-circuit does not work; when one end of the detection capacitor is connected with the power supply through the electronic ballast, the detection capacitor is accessed, and the ballast sub-circuit works.

As an improvement to the above scheme, the ballast sub-circuit includes a voltage stabilizing diode, an energy storage capacitor, a discharging resistor, a first rectifying diode, a second rectifying diode and a field effect transistor; the voltage stabilizing diode, the energy storage capacitor and the discharging resistor are mutually connected in parallel, a negative electrode of the voltage stabilizing diode is connected with a gate of the field effect transistor and is connected with the detection capacitor through the first rectifying diode; a positive electrode of the voltage stabilizing diode is connected with a source electrode of the field effect transistor and is connected with the detection capacitor through the second rectifying diode; a drain electrode of the field effect transistor is connected with the output rectifying and filtering circuit.

As an improvement to the above scheme, the PWM control integrated circuit includes a PWM control chip, a compensation capacitor, a sampling resistor group, a sampling capacitor and a detection resistor; the PWM control chip is provided with a chip power supply pin, a compensation pin, an output current sampling pin, a loop feedback pin, a driving pin and a grounding pin; the chip power supply pin is connected with the IC power supply circuit, the compensation pin is grounded through the compensation capacitor, the output current sampling pin is grounded through the sampling resistor group and is connected with the output rectifying and filtering circuit through the sampling resistor group and the sampling capacitor, the loop feedback pin is connected with the IC power supply circuit and is grounded through the detection resistor, the driving pin is connected with the Buck circuit, and the grounding pin is grounded.

As an improvement to the above scheme, the Buck circuit includes a step-down resistor, a step-down capacitor, a step-down diode and a step-down inductor; one end of the step-down resistor is connected with the PWM control integrated circuit through the step-down capacitor, and the other end of the step-down resistor is connected with the input rectifying circuit; a positive electrode of the step-down diode is connected with the PWM control integrated circuit, and a negative electrode of the step-down diode is connected with the input rectifying circuit; one end of the step-down inductor is connected with the PWM control integrated circuit, and the other end of the step-down inductor is connected with the output rectifying and filtering circuit.

As an improvement to the above scheme, the IC power supply circuit includes a charging resistor group, a charging capacitor, a charging diode, a first charging resistor, a second charging resistor and a charging inductor; one end of the charging resistor group is connected with the input rectifying circuit, and the other end of the charging resistor group is connected with the PWM control integrated circuit; one end of the charging capacitor is connected with the input rectifying circuit, and the other end of the charging capacitor is connected with the PWM control integrated circuit; one end of the charging inductor is grounded, the other end of the charging inductor is connected with the PWM control integrated circuit through the first charging resistor and connected with the PWM control integrated circuit through the charging diode and the second charging resistor sequentially.

As an improvement to the above scheme, the LED driving circuit further includes any one or a combination of a two-terminal contact protection circuit, an over-voltage and over-current protection circuit and an EMC filtering circuit.

As an improvement to the above scheme, when the power supply enters the LED load through a single end of the LED driving circuit, the two-terminal contact protection circuit is not turned on; when the power supply enters the LED load through a double-end of the LED driving circuit, the two-terminal contact protection circuit is turned on.

As an improvement to the above scheme, the over-voltage and over-current protection circuit includes a first piezoresistor and a second piezoresistor; wherein the first piezoresistor is arranged at two ends of the input rectifying circuit, and the second piezoresistor is connected with a reverse output end of the input rectifying circuit.

As an improvement to the above scheme, the EMC filtering circuit includes a first common-mode inductor group, a second common-mode inductor group, a first filtering capacitor, a second filtering capacitor, a third filtering capacitor and a fourth filtering capacitor; the first filtering capacitor and the second filtering capacitor are arranged at two ends of the input rectifying circuit; the first common-mode inductor group is connected with one output end of the input rectifying circuit, the second common-mode inductor group is connected with the other output end of the input rectifying circuit; one end of the third filtering capacitor is connected with one input end of the input rectifying circuit, and the other end of the third filtering capacitor is connected with the compatible electronic ballast circuit; one end of the fourth filtering capacitor is connected with the other input end of the input rectifying circuit, and the other end of the fourth filter capacitor is connected with the compatible electronic ballast circuit.

The present invention has the following beneficial effects:

The invention is suitable for a T-shaped lamp tube, can realize the compatibility of single-ended input of AC mains, double-ended input of AC mains and double-ended input of an electronic ballast, and is simple in circuit, low in system cost, small in size, high in efficiency and stable in performance. Specifically, when the T-shaped lamp tube is connected with the single-ended or double-ended input of the AC mains supply, the compatible electronic ballast circuit does not work, and the PWM control integrated circuit drives the LED load. When the T-shaped lamp tube is connected with the double-ended end of the electronic ballast, the output of the PWM control integrated circuit is zero, and the compatible electronic ballast circuit works to drive the LED load.

DETAILED DESCRIPTION

In order to make the objectives, technical solutions, and advantages of the present invention clearer and more comprehensible, the present invention is described in further detail below with reference to the embodiments and accompanying drawings.

The LED driving circuit based on a T-shaped lamp tube of the present invention is suitable for a T-shaped lamp tube, can realize the compatibility of single-ended input of AC mains, double-ended input of AC mains and double-ended input of an electronic ballast, and is simple in circuit, low in system cost, small in size, high in efficiency and stable in performance.

Figure 4:
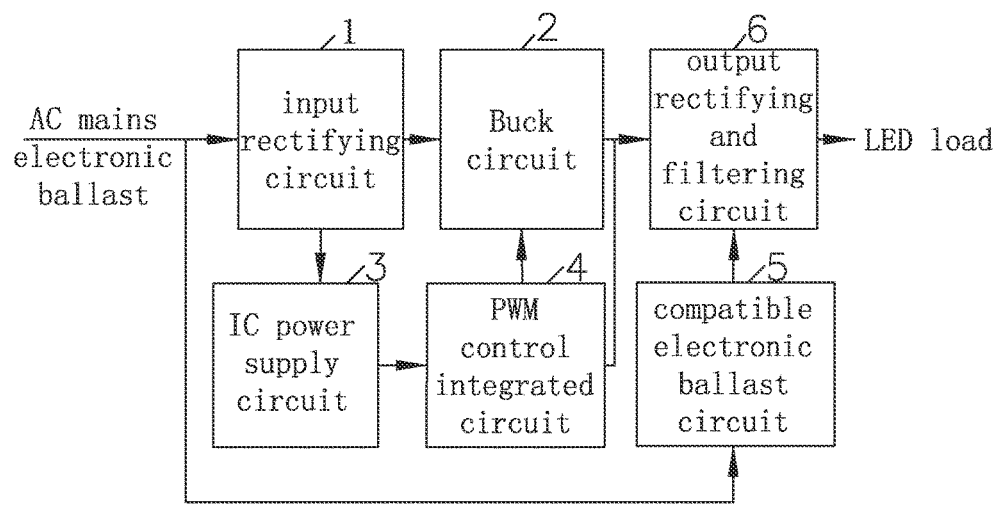
FIG. 4 is a schematic structural diagram of a first embodiment of a LED driving circuit based on a T-shaped lamp tube of the present invention.

Referring to FIG. 4, FIG. 4 shows a first embodiment of a LED driving circuit based on a T-shaped lamp tube, which includes an input rectifying circuit 1, a Buck circuit 2, an IC power supply circuit 3, a PWM control integrated circuit 4, a compatible electronic ballast circuit 5 and an output rectifying and filtering circuit 6; wherein the input rectifying circuit, the Buck circuit, the IC power supply circuit, the PWM control integrated circuit, the compatible electronic ballast circuit, and the output rectifying and filtering circuit are electrically connected with each other. wherein the input rectifying circuit 1 is used for rectifying an input power supply into direct current; The Buck circuit 2 is used for bucking; the IC power supply circuit 3 is used for supplying power for the PWM control integrated circuit 4; the PWM control integrated circuit 4 is used for providing a signal to control PWM (Pulse Width Modulation) for the Buck circuit 2; the compatible electronic ballast circuit 5 is used for being compatible with an electronic ballast; and the output rectifying and filtering circuit 6 is used for rectifying and filtering the output current.

output ends of the input rectifying circuit 1 are respectively connected with an input end of the Buck circuit 2 and an input end of the IC power supply circuit 3, an output end of the Buck circuit 2 is connected with an input end of the output rectifying and filtering circuit 6, an output end of the IC power supply circuit 3 is connected with an input end of the PWM control integrated circuit 4, output ends of the PWM control integrated circuit 4 are respectively connected with the input end of the Buck circuit 2 and the input end of the output rectifying and filtering circuit 6; and an output end of the output rectifying and filtering circuit 6 is connected with a LED load. The LED load is preferably an LED T-shaped lamp tube.

an output end of the compatible electronic ballast circuit 5 is connected with the input end of the output rectifying and filtering circuit 6.

an input end of the input rectifying circuit 1 and an input end of the compatible electronic ballast circuit 5 are connected with a power supply; when the input end of the input rectifying circuit 1 and the input end of the compatible electronic ballast circuit 5 are directly connected with the power supply, the input end of the compatible electronic ballast circuit 5 does not work, and when the input end of the input rectifying circuit 1 and the input end of the compatible electronic ballast circuit 5 are connected with the power supply through the electronic ballast, the input end of the compatible electronic ballast circuit 5 works.

Figure 1:
FIG. 1 is a schematic structural diagram of a T-shaped lamp tube connected with a single-ended input of the AC mains supply.
Figure 2:
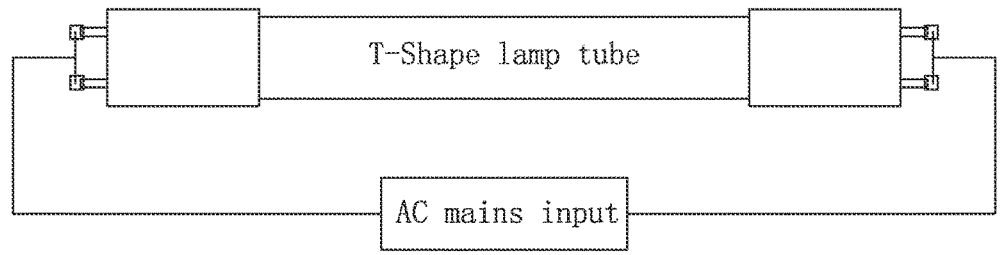
FIG. 2 is a schematic structural diagram of a T-shaped lamp tube connected with a double-ended input of the AC mains supply.
Figure 3:
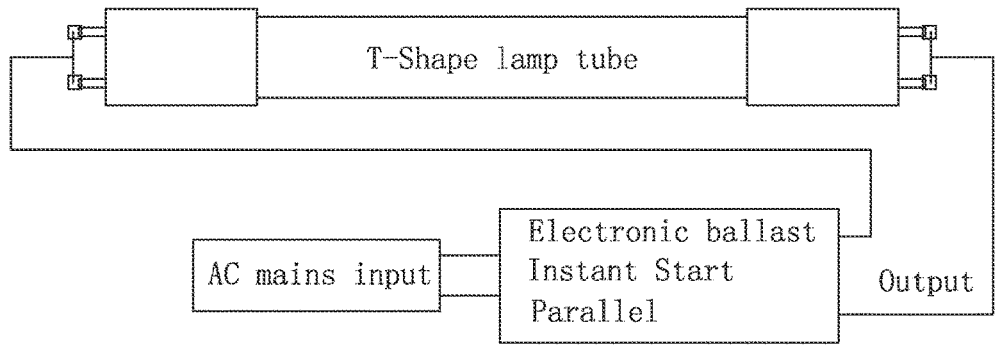
FIG. 3 is a schematic structural diagram of a T-shaped lamp tube connected with a double-ended input of the electronic ballast.

It should be noted that, the present invention can realize the compatibility of single-ended input of AC mains, double-ended input of AC mains and double-ended input of an electronic ballast. Referring to FIGS. 1-3, FIG. 1 is a schematic structural diagram of a T-shaped lamp tube connected with a single-ended input of the AC mains supply, FIG. 2 is a schematic structural diagram of a T-shaped lamp tube connected with a double-ended input of the AC mains supply, FIG. 3 is a schematic structural diagram of a T-shaped lamp tube connected with a double-ended input of the electronic ballast. When the LED load is connected with the single-ended input of the AC mains supply, the compatible electronic ballast circuit 5 does not work, the input rectifying circuit 1, the Buck circuit 2, the IC power supply circuit 3, the PWM control integrated circuit 4 and the output rectifying and filtering circuit 6 work to drive the LED load to emit light; when the LED load is connected with the double-ended input of the AC mains supply, the compatible electronic ballast circuit 5 does not work, the input rectifying circuit 1, the Buck circuit 2, the IC power supply circuit 3, the PWM control integrated circuit 4 and the output rectifying and filtering circuit 6 work to drive the LED load to emit light; when the LED load is connected with the double-ended input of the electronic ballast, the output of the PWM control integrated circuit 4 is "0", the input rectifying circuit 1, the compatible electronic ballast circuit 5 and the output rectifying and filtering circuit 6 work to drive the LED load to emit light.

Therefore, the single-ended input of the AC mains supply, the double-ended input of the AC mains supply or the double-ended input of the electronic ballast are realized through the working state of the compatible electronic ballast circuit 5, so that the present invention has high flexibility.

Figure 5:
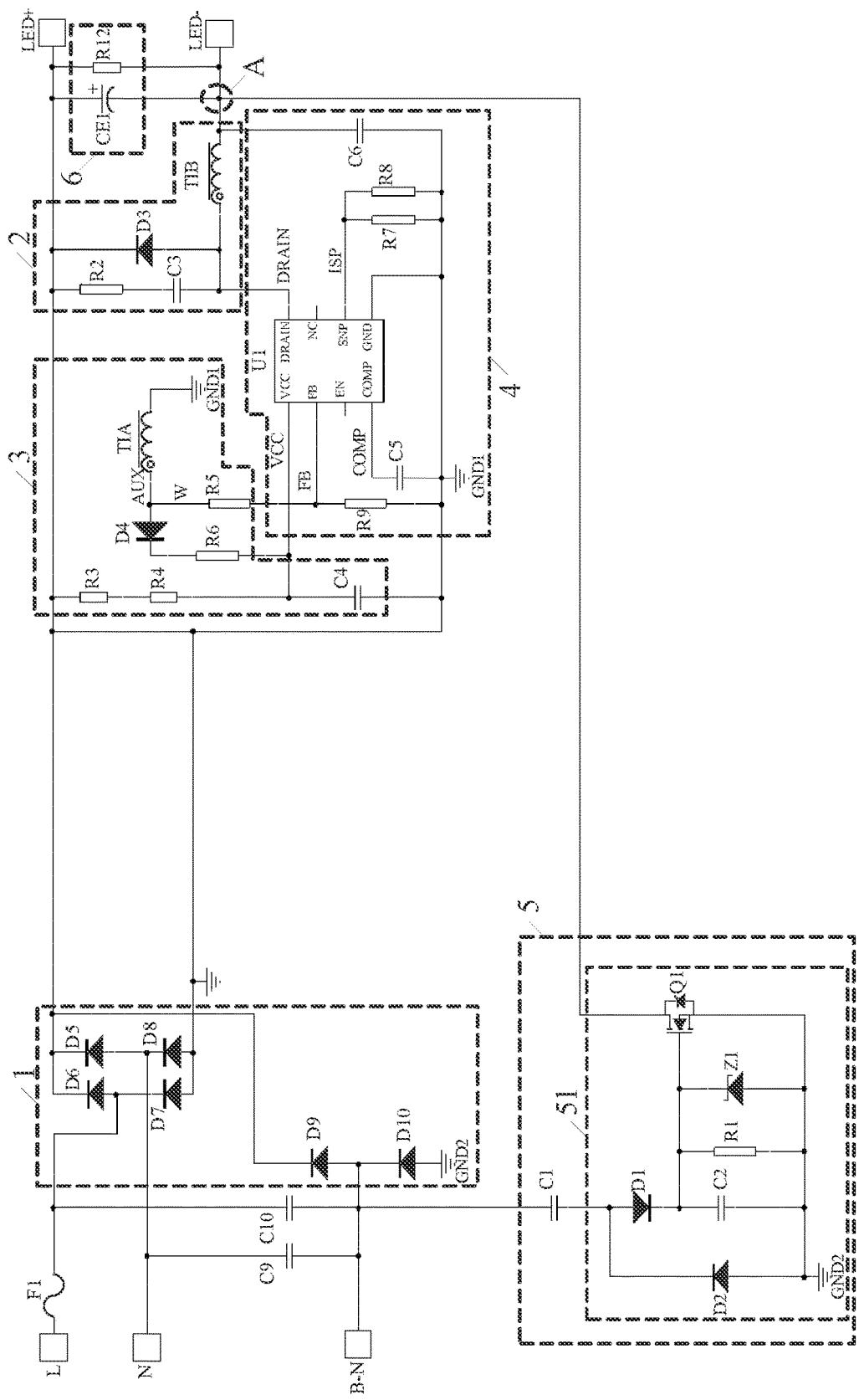
FIG. 5 is a circuit diagram of a first embodiment of a LED driving circuit based on a T-shaped lamp tube of the present invention.

Referring to FIG. 5, the compatible electronic ballast circuit 5 includes a detection capacitor C1 and a ballast sub-circuit 51, one end of the detection capacitor C1 is connected with the power supply, the other end of the detection capacitor C1 is connected with an input end of the ballast sub-circuit 51, and an output end of the ballast sub-circuit 51 is connected with the input end of the output rectifying and filtering circuit 6; when one end of the detection capacitor C1 is directly connected with the power supply, the detection capacitor C1 is broken, and the ballast sub-circuit 51 does not work; when one end of the detection capacitor C1 is connected with the power supply through the electronic ballast, the detection capacitor C1 is accessed, and the ballast sub-circuit 51 works.

It should be noted that, the detection capacitor C1 has the characteristics of accessing high frequency and resisting low frequency. When the LED load is connected with the single-ended/double-ended input of the AC mains supply, the current frequency of the AC mains supply is low, so that the current is interrupted in the midway, the detection capacitor C1 is switched off, and the ballast sub-circuit 51 does not work; when the LED load is connected with the double-ended input of the electronic ballast, the current frequency output by the electronic ballast is high, so that the current flows up all the time, the detection capacitor C1 path is detected, and the ballast sub-circuit 51 works. Therefore, the working state of the compatible electronic ballast circuit 5 is determined by detecting the on-off state of the detection capacitor C1, so that the present invention can realize the compatibility of single-ended input of AC mains, double-ended input of AC mains and double-ended input of an electronic ballast, and is low in system cost, small in size, and high in flexibility.

Further, the ballast sub-circuit 51 includes a voltage stabilizing diode Z1, an energy storage capacitor C2, a discharging resistor R1, a first rectifying diode D1, a second rectifying diode D2 and a field effect transistor Q1; the voltage stabilizing diode Z1, the energy storage capacitor C2 and the discharging resistor R1 are mutually connected in parallel, a negative electrode of the voltage stabilizing diode Z1 is connected with a gate of the field effect transistor Q1 and is connected with the detection capacitor C1 through the first rectifying diode D1; a positive electrode of the voltage stabilizing diode Z1 is connected with a source electrode of the field effect transistor Q1 and is connected with the detection capacitor C1 through the second rectifying diode D2; a drain electrode of the field effect transistor Q1 is connected with the output rectifying and filtering circuit 6.

The input rectifying circuit 1 is a rectifying bridge, and the output rectifying and filtering circuit 6 is an RC oscillation circuit.

The Buck circuit 2 includes a step-down resistor R2, a step-down capacitor C3, a step-down diode D3 and a step-down inductor T1B; one end of the step-down resistor R2 is connected with the PWM control integrated circuit 4 through the step-down capacitor C3, and the other end of the step-down resistor R2 is connected with the input rectifying circuit 1; a positive electrode of the step-down diode D3 is connected with the PWM control integrated circuit 4, and a negative electrode of the step-down diode D3 is connected with the input rectifying circuit 1; one end of the step-down inductor T1B is connected with the PWM control integrated circuit 4, and the other end of the step-down inductor T1B is connected with the output rectifying and filtering circuit 6.

The IC power supply circuit 3 includes a charging resistor group (R3, R4), a charging capacitor C4, a charging diode D4, a first charging resistor R5, a second charging resistor R6 and a charging inductor T1A; one end of the charging resistor group (R3, R4) is connected with the input rectifying circuit 1, and the other end of the charging resistor group (R3, R4) is connected with the PWM control integrated circuit 4; one end of the charging capacitor C4 is connected with the input rectifying circuit 1, and the other end of the charging capacitor C4 is connected with the PWM control integrated circuit 4; one end of the charging inductor TIA is grounded, the other end of the charging inductor TIA is connected with the PWM control integrated circuit 4 through the first charging resistor R5 and connected with the PWM control integrated circuit 4 through the charging diode D4 and the second charging resistor R6 sequentially. Preferably, the charging resistor group (R3, R4) includes at least two resistors in series.

the PWM control integrated circuit 4 includes a PWM control chip U1, a compensation capacitor C5, a sampling resistor group (R7, R8), a sampling capacitor C6 and a detection resistor R9; the PWM control chip U1 is provided with a chip power supply pin VCC, a compensation pin COMP, an output current sampling pin SNP, a loop feedback pin FB, a driving pin DRAIN and a grounding pin GND; the chip power supply pin VCC is connected with the IC power supply circuit 3, the compensation pin COMP is grounded through the compensation capacitor C5, the output current sampling pin SNP is grounded through the sampling resistor group (R7, R8) and is connected with the output rectifying and filtering circuit 6 through the sampling resistor group (R7, R8) and the sampling capacitor C6, the loop feedback pin FB is connected with the IC power supply circuit 3 and is grounded through the detection resistor R9, the driving pin DRAIN is connected with the Buck circuit 2, and the grounding pin GND is grounded. Preferably, the sampling resistor group (R7, R8) includes at least two resistors in parallel.

In particular, the PWM control chip U1 can be a JW1602D chip, but is not limited thereto, and the PWM control chip U1 is packaged by using SO8-8, and the pins of the PWM control chip U1 are defined as follows:

| Pin | Name | Description |
| --- | --- | --- |
| 1 | SNP | output current sampling pin - which is used for controlling the size of the output current |
| 2 | GND | grounding pin - This pin is used for grounding |
| 3 | NC | connectionless |
| 4 | DRAIN | driving pin - built-in drain D of a MOS transistor output pin |
| 5 | VCC | chip power supply pin - which provides current for the internal circuit of the chip, needs to be connected with a bypass capacitor |
| 6 | EN | Enable Pin to ON/OFF the output |
| 7 | FB | loop feedback pin - the pin detects whether the LED is open or short by sampling the output voltage |
| 8 | COMP | The pin is connected with the internal feedback loop for capacitance compensation |

It should be noted that, JW1602D is specifically an LED chip and can be applied to a non-isolated buck-type LED system which controls PFC by constant current driving with a source lighting design. JW1602D only requires few peripheral devices to achieve excellent constant current characteristics, low system cost and high efficiency.

The present invention is described in further detail below in conjunction with specific circuits.

(1) When the LED load is connected with the single-ended input or the double-ended input of the AC mains supply, the compatible electronic ballast circuit 5 does not work, the input rectifying circuit 1, the Buck circuit 2, the IC power supply circuit 3, the PWM control integrated circuit 4 and the output rectifying and filtering circuit 6 work to drive the LED load to emit light.

Start-Up:

After the system is powered on, the bus voltage charges the VCC of the PWM control chip U1 through the charging resistor group (R3, R4), when the VCC voltage of the PWM control chip U1 reaches 22V, the gate driving signal starts the switch, the PWM control chip U1 enters a stable operating state, and the output voltage is changed to power the PWM control chip. The PWM control chip U1 has a VCC voltage protection function, when the VCC voltage exceeds 35 V, the 6 mA current inside the PWM control chip U1 will pull low the VCC, and once the VCC voltage is lower than 7 V, the PWM control chip U1 stops working.

Loop Compensation:

The integration link is introduced into the input current loop by connecting the compensation capacitor C5 with the compensation pin COMP of the PWM control chip U1. In offline applications, the ride-through frequency is much greater than the secondary power frequency 120 Hz or 100 Hz. To achieve a better PFC (power factor correction) effect, the compensation pin COMP needs to be connected with a suitable compensation capacitor C5.

Constant Current Control:

The PWM control chip U1 controls the output current of the system according to the voltage signal on the sampling resistor group. The calculation formula for the output current average of the system is: ILED=300/Rcs (mA), where the Rcs is the resistance of the sampling resistor group (R7, R8) between the output current sampling pin SNP and the grounding pin GND.

Critical Conduction Mode:

The PWM control chip U1 operates in a mode with inductive and current continuous conduction. When the PWM control chip U1 controls the external MOSFET to conduct, the current flowing through the inductor begins to rise from zero; when the PWM control chip U1 controls the external MOSFET to turn off, the current flowing through the inductor begins to drop from the peak, and when the current of the inductor drops to zero, the PWM control chip U1 again controls the MOSFET to conduct.

(2) when the LED load is connected with the double-ended input of the electronic ballast, the PWM control chip U1 need not to work, the input rectifying circuit 1, the output rectifying and filtering circuit 6 and the compatible electronic ballast circuit 5 work to drive the LED load to emit light.

When the compatible electronic ballast circuit 5 is turned on, the potential of the position point A of the compatible electronic ballast circuit 5 becomes zero so that the output of the PWM control chip U1 is zero, and the operation of the PWM control chip U1 has no effect on the LED load, so that the LED load is compatible with the electronic ballast and can also work normally.

Therefore, the invention is applicable to T-shaped lamp tubes, can realize the compatibility of single-ended input of AC mains, double-ended input of AC mains and double-ended input of an electronic ballast, and is simple in circuit, low in system cost, small in size, high in efficiency and stable in performance.

Figure 6:
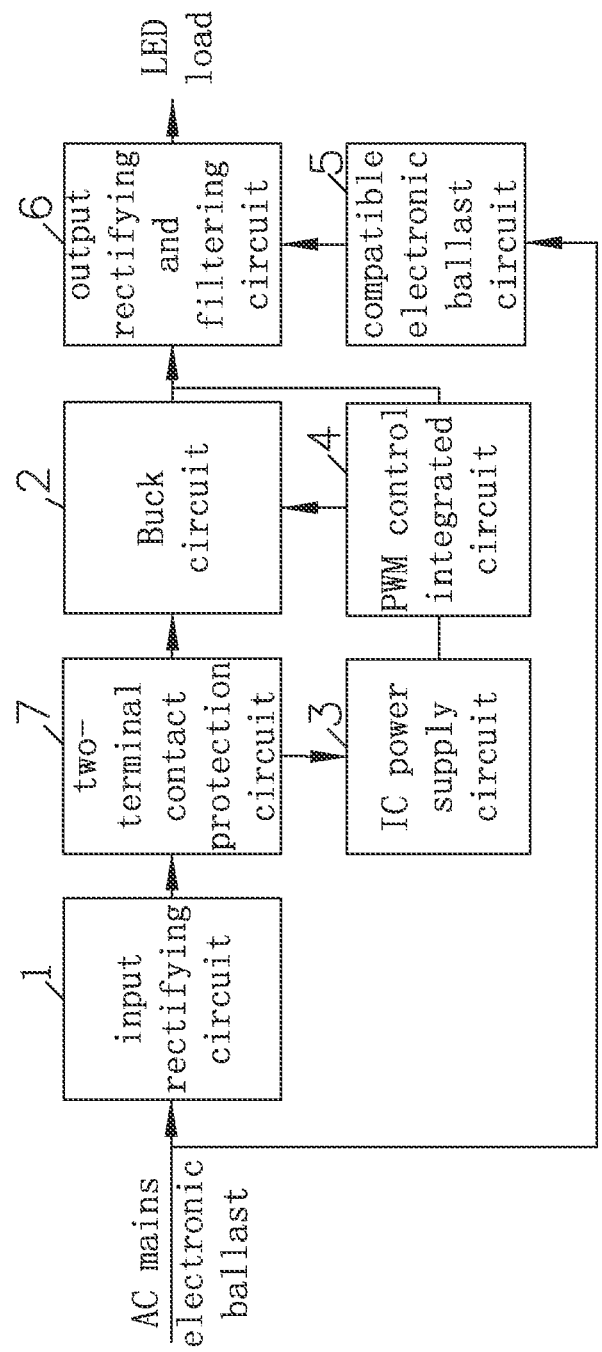
FIG. 6 is a schematic structural diagram of a second embodiment of a LED driving circuit based on a T-shaped lamp tube of the present invention.
Figure 7:
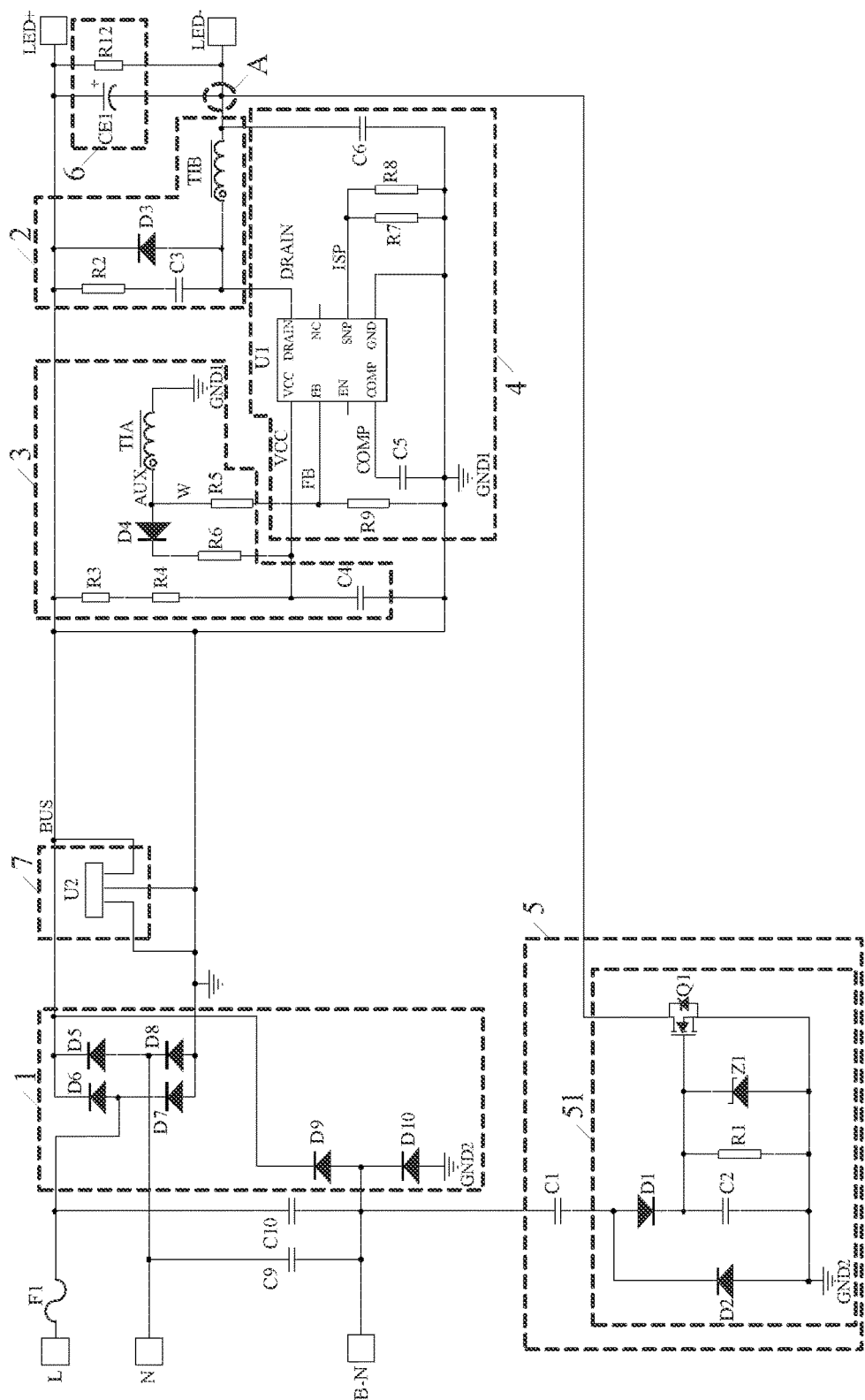
FIG. 7 is a circuit diagram of a second embodiment of a LED driving circuit based on a T-shaped lamp tube of the present invention.

Referring to FIG. 6 and FIG. 7, FIG. 6 and FIG. 7 show a second embodiment of a LED driving circuit based on a T-shaped lamp tube of the present invention. Different from the first embodiment shown in FIG. 4 and FIG. 5, the embodiment further includes a two-terminal contact protection circuit 7. The two-terminal contact protection circuit 7 is internally provided with a protection chip U2. When the power supply enters the LED load through a single end of the LED driving circuit, the two-terminal contact protection circuit 7 is not turned on; when the power supply enters the LED load through a double-end of the LED driving circuit, the two-terminal contact protection circuit 7 is turned on. The two-terminal contact protection chip 7 is preferably LT2600, but is not limited thereto.

After the system is powered on, if only a pin at one end of the T-shaped lamp tube is accessed, the two-terminal contact protection circuit 7 is not turned on, and the circuit cannot work; when pins at two ends of the T-shaped lamp tube are simultaneously accessed, the two-terminal contact protection circuit 7 is turned on. Therefore, by means of the two-terminal contact protection circuit 7, it is guaranteed that when only one pin at one end of the T-shaped lamp tube is accessed, the other pin does not work, so that when the user contacts the other pin of the other end, an electric shock accident cannot occur.

Figure 8:
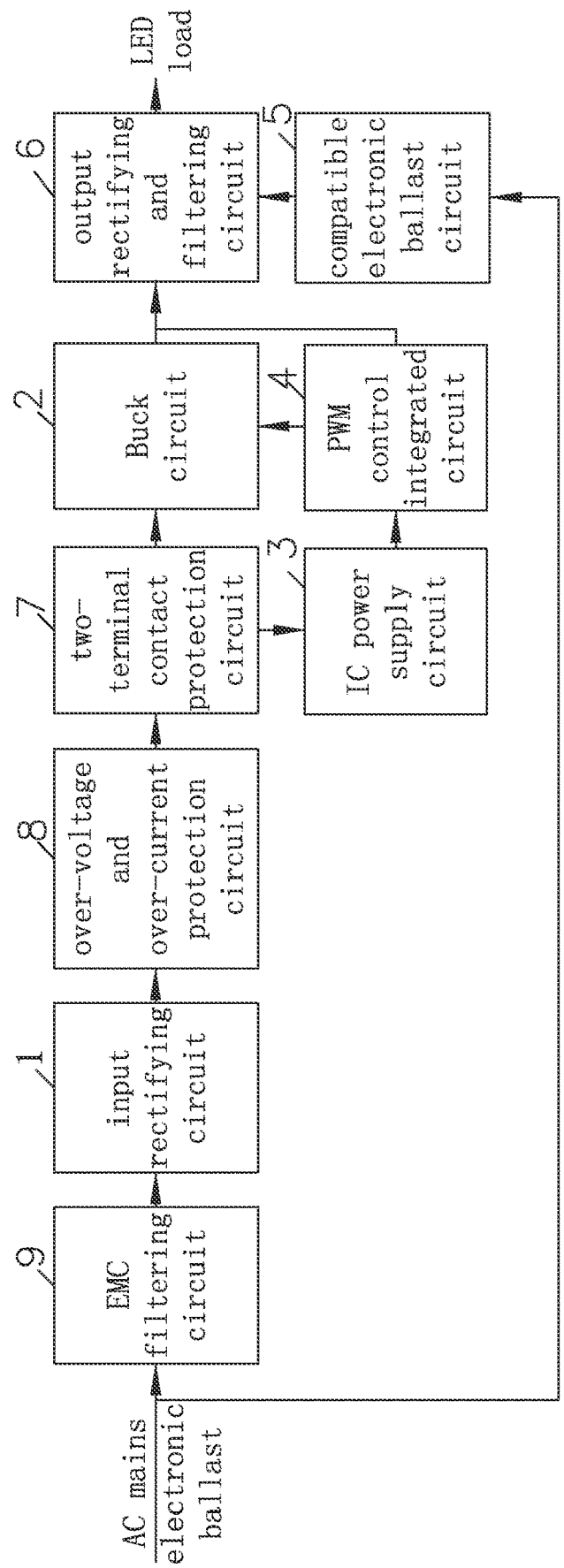
FIG. 8 is a schematic structural diagram of a third embodiment of a LED driving circuit based on a T-shaped lamp tube of the present invention.
Figure 9:
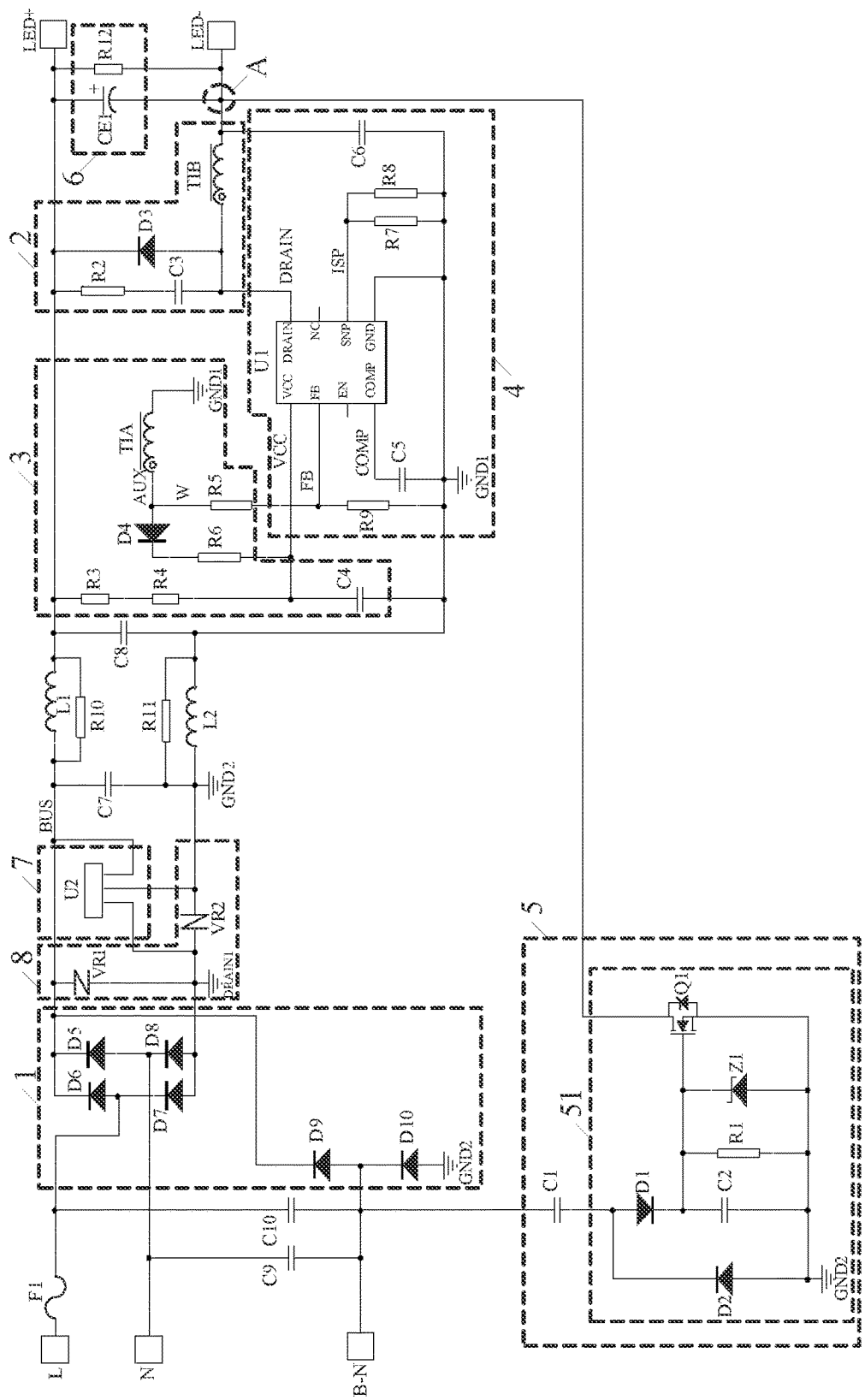
FIG. 9 is a circuit diagram of a third embodiment of a LED driving circuit based on a T-shaped lamp tube of the present invention.

Referring to FIG. 8 and FIG. 9, FIG. 8 and FIG. 9 show a second embodiment of a LED driving circuit based on a T-shaped lamp tube, different from the first embodiment shown in FIGS. 4 and 5. The embodiment further includes a two-terminal contact protection circuit 7, an over-voltage and over-current protection circuit 8, and an EMC filtering circuit 9.

The over-voltage and over-current protection circuit 8 includes a first piezoresistor VR1 and a second piezoresistor VR2; wherein the first piezoresistor VR1 is arranged at two ends of the input rectifying circuit 1, and the second piezoresistor VR2 is connected with a reverse output end of the input rectifying circuit 1.

The EMC filtering circuit 9 includes a first common-mode inductor group (L1, R10), a second common-mode inductor group (L2, R11), a first filtering capacitor C7, a second filtering capacitor C8, a third filtering capacitor C9 and a fourth filtering capacitor C10; the first filtering capacitor C7 and the second filtering capacitor C8 are arranged at two ends of the input rectifying circuit 1; the first common-mode inductor group (L1, R10) is connected with one output end of the input rectifying circuit 1, the second common-mode inductor group (L2, R11) is connected with the other output end of the input rectifying circuit 1; one end of the third filtering capacitor C9 is connected with one input end of the input rectifying circuit 1, and the other end of the third filtering capacitor C9 is connected with the compatible electronic ballast circuit 5; one end of the fourth filtering capacitor C10 is connected with the other input end of the input rectifying circuit 1, and the other end of the fourth filter capacitor C10 is connected with the compatible electronic ballast circuit 5. The first common-mode inductor group (L1, R10) and the second common-mode inductor group (L2, R11) each include a hollow inductor and a resistor connected in parallel with each other, and can effectively filter an Electro Magnetic Interference (EMI) signal.

When the LED load is connected with the single-ended input of the AC mains supply, the compatible electronic ballast circuit 5 and the two-terminal contact protection circuit 7 do not work, the input rectifying circuit 1, the over-voltage and over-current protection circuit 8, the EMC filtering circuit 9, the Buck circuit 2, the IC power supply circuit 3, the PWM control integrated circuit 4 and the output rectifying and filtering circuit 6 work to drive the LED load to emit light; when the LED load is connected with the double-ended input of the AC mains supply, the compatible electronic ballast circuit 5 does not work, the input rectifying circuit 1, the over-voltage and over-current protection circuit 8, the EMC filtering circuit 9, the two-terminal contact protection circuit 7, the Buck circuit 2, the IC power supply circuit 3, the PWM control integrated circuit 4 and the output rectifying and filtering circuit 6 work to drive the LED load to emit light; when the LED load is connected with the double-ended input of the electronic ballast, the output of the PWM control integrated circuit 4 is "0", the input rectifying circuit 1, the over-voltage and over-current protection circuit 8, the EMC filtering circuit 9, the two-terminal contact protection circuit 7, the compatible electronic ballast circuit 5 and the output rectifying and filtering circuit 6 work to drive the LED load to emit light.

It should be noted that, the two-terminal contact protection circuit 7, The over-voltage and over-current protection circuit 8 and the EMC filtering circuit 9 are independent of each other, the engineering personnel may add or delete the two-terminal contact protection circuit 7, the over-voltage and over-current protection circuit 8 or the EMC filtering circuit 9 in the LED driving circuit according to the actual situation. For example, the two-terminal contact protection circuit 7, the over-voltage and over-current protection circuit 8 or the EMC filtering circuit 9 may be provided separately; the two-terminal contact protection circuit 7 and the over-voltage and over-current protection circuit 8, the over-voltage and over-current protection circuit 8 and the EMC filtering circuit 9, or the two-terminal contact protection circuit 7 and the EMC filtering circuit 9 may be provided optionally; the two-terminal contact protection circuit 7, the over-voltage and over-current protection circuit 8 and the EMC filtering circuit 9 may be provided concurrently, which is high in flexibility.

It can be seen from the above, the invention is applicable to T-shaped lamp tubes, can realize the compatibility of single-ended input of AC mains, double-ended input of AC mains and double-ended input of an electronic ballast, and is simple in circuit, low in system cost, small in size, high in efficiency and stable in performance. Specifically, when the T-shaped lamp tube is connected with the single-ended input or the double-ended input of the AC mains supply, the compatible electronic ballast circuit 5 does not work, the PWM control integrated circuit 4 drive the LED load; when the T-shaped lamp tube is connected with the double-ended input of the electronic ballast, the output of the PWM control integrated circuit 4 is "0", the compatible electronic ballast circuit 5 work to drive the LED load.

The above merely describes preferred embodiments of the present invention. It should be noted that, several improvements and modifications may be made by those of ordinary skill in the art without departing from the principle of the present application, and these improvements and modifications should also be considered within the scope of protection of the present invention.

The invention claimed is:
1. A LED driving circuit based on a T-shaped lamp tube comprising:
  an input rectifying circuit, a Buck circuit, an IC power supply circuit, a PWM control integrated circuit, a compatible electronic ballast circuit, and an output rectifying and filtering circuit, wherein the input rectifying circuit, the Buck circuit, the IC power supply circuit, the PWM control integrated circuit, the compatible electronic ballast circuit, and the output rectifying and filtering circuit are electrically connected with each other;
  output ends of the input rectifying circuit are respectively connected with an input end of the Buck circuit and an input end of the IC power supply circuit, an output end of the Buck circuit is connected with an input end of the output rectifying and filtering circuit, an output end of the IC power supply circuit is connected with an input end of the PWM control integrated circuit, output ends of the PWM control integrated circuit are respectively connected with the input end of the Buck circuit and the input end of the output rectifying and filtering circuit;

an output end of the compatible electronic ballast circuit is connected with the input end of the output rectifying and filtering circuit;

an input end of the input rectifying circuit and an input end of the compatible electronic ballast circuit are connected with a power supply; when the input end of the input rectifying circuit and the input end of the compatible electronic ballast circuit are directly connected with the power supply, the input end of the compatible electronic ballast circuit does not work, and when the input end of the input rectifying circuit and the input end of the compatible electronic ballast circuit are connected with the power supply through the electronic ballast, the input end of the compatible electronic ballast circuit works.

2. The LED driving circuit based on a T-shaped lamp tube according to claim 1, wherein the compatible electronic ballast circuit comprises a detection capacitor and a ballast sub-circuit, one end of the detection capacitor is connected with the power supply, the other end of the detection capacitor is connected with an input end of the ballast sub-circuit, and an output end of the ballast sub-circuit is connected with the input end of the output rectifying and filtering circuit;

when one end of the detection capacitor is directly connected with the power supply, the detection capacitor is broken, and the ballast sub-circuit does not work;

when one end of the detection capacitor is connected with the power supply through the electronic ballast, the detection capacitor is accessed, and the ballast sub-circuit works.

3. The LED driving circuit based on a T-shaped lamp tube according to claim 2, wherein the ballast sub-circuit comprises a voltage stabilizing diode, an energy storage capacitor, a discharging resistor, a first rectifying diode, a second rectifying diode and a field effect transistor;

the voltage stabilizing diode, the energy storage capacitor and the discharging resistor are mutually connected in parallel, a negative electrode of the voltage stabilizing diode is connected with a gate of the field effect transistor and is connected with the detection capacitor through the first rectifying diode; a positive electrode of the voltage stabilizing diode is connected with a source electrode of the field effect transistor and is connected with the detection capacitor through the second rectifying diode; a drain electrode of the field effect transistor is connected with the output rectifying and filtering circuit.

4. The LED driving circuit based on a T-shaped lamp tube according to claim 1, wherein the PWM control integrated circuit comprises a PWM control chip, a compensation capacitor, a sampling resistor group, a sampling capacitor and a detection resistor;

the PWM control chip is provided with a chip power supply pin, a compensation pin, an output current sampling pin, a loop feedback pin, a driving pin and a grounding pin;

the chip power supply pin is connected with the IC power supply circuit, the compensation pin is grounded through the compensation capacitor, the output current sampling pin is grounded through the sampling resistor group and is connected with the output rectifying and filtering circuit through the sampling resistor group and the sampling capacitor, the loop feedback pin is connected with the IC power supply circuit and is grounded through the detection resistor, the driving pin is connected with the Buck circuit, and the grounding pin is grounded.

5. The LED driving circuit based on a T-shaped lamp tube according to claim 1, wherein the Buck circuit comprises a step-down resistor, a step-down capacitor, a step-down diode and a step-down inductor;

one end of the step-down resistor is connected with the PWM control integrated circuit through the step-down capacitor, and the other end of the step-down resistor is connected with the input rectifying circuit;

a positive electrode of the step-down diode is connected with the PWM control integrated circuit, and a negative electrode of the step-down diode is connected with the input rectifying circuit;

one end of the step-down inductor is connected with the PWM control integrated circuit, and the other end of the step-down inductor is connected with the output rectifying and filtering circuit.

6. The LED driving circuit based on a T-shaped lamp tube according to claim 1, wherein the IC power supply circuit comprises a charging resistor group, a charging capacitor, a charging diode, a first charging resistor, a second charging resistor and a charging inductor;

one end of the charging resistor group is connected with the input rectifying circuit, and the other end of the charging resistor group is connected with the PWM control integrated circuit;

one end of the charging capacitor is connected with the input rectifying circuit, and the other end of the charging capacitor is connected with the PWM control integrated circuit;

one end of the charging inductor is grounded, the other end of the charging inductor is connected with the PWM control integrated circuit through the first charging resistor and connected with the PWM control integrated circuit through the charging diode and the second charging resistor sequentially.

7. The LED driving circuit based on a T-shaped lamp tube according to claim 1, wherein the LED driving circuit further comprises any one or a combination of a two-terminal contact protection circuit, an over-voltage and over-current protection circuit and an EMC filtering circuit.

8. The LED driving circuit based on a T-shaped lamp tube according to claim 7, wherein when the power supply enters the LED load through a single end of the LED driving circuit, the two-terminal contact protection circuit is not turned on; when the power supply enters the LED load through a double-end of the LED driving circuit, the two-terminal contact protection circuit is turned on.

9. The LED driving circuit based on a T-shaped lamp tube according to claim 7, wherein the over-voltage and over-current protection circuit comprises a first piezoresistor and a second piezoresistor; wherein the first piezoresistor is arranged at two ends of the input rectifying circuit, and the second piezoresistor is connected with a reverse output end of the input rectifying circuit.

10. The LED driving circuit based on a T-shaped lamp tube according to claim 7, wherein the EMC filtering circuit comprises a first common-mode inductor group, a second common-mode inductor group, a first filtering capacitor, a second filtering capacitor, a third filtering capacitor and a fourth filtering capacitor;

the first filtering capacitor and the second filtering capacitor are arranged at two ends of the input rectifying circuit;

the first common-mode inductor group is connected with one output end of the input rectifying circuit, the second common-mode inductor group is connected with the other output end of the input rectifying circuit;

one end of the third filtering capacitor is connected with one input end of the input rectifying circuit, and the other end of the third filtering capacitor is connected with the compatible electronic ballast circuit;

one end of the fourth filtering capacitor is connected with the other input end of the input rectifying circuit, and the other end of the fourth filter capacitor is connected with the compatible electronic ballast circuit.

* * * * *